(12) United States Patent
Ban (10) Patent No.: US 6,332,170 B1
(45) Date of Patent: Dec. 18, 2001

(54) PRINTING APPARATUS WITH JOB INTERRUPT CAPABILITIES AND CONTROL METHOD THEREOF

(75) Inventor: Shinichi Ban, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/189,420

(22) Filed: Nov. 10, 1998

(30) Foreign Application Priority Data

Nov. 11, 1997 (JP) .................................................. 9-308424

(51) Int. Cl.[7] .............................. G06F 3/12; G06F 15/17; G06F 13/10
(52) U.S. Cl. ............................. 710/6; 358/437; 358/1.12; 358/1.13; 709/103
(58) Field of Search ........................ 710/1, 5–7; 358/437, 358/1.9–1.13; 709/100–108

(56) References Cited

U.S. PATENT DOCUMENTS

| | | | |
|---|---|---|---|
| 4,843,571 | * | 6/1989 | Notermans et al. ................. 395/117 |
| 4,947,345 | * | 8/1990 | Paradise et al. ..................... 358/442 |
| 5,206,735 | * | 4/1993 | Gauronski et al. .................. 358/296 |
| 5,351,136 | * | 9/1994 | Wu et al. ............................. 358/440 |
| 5,392,131 | * | 2/1995 | Umeno ................................. 358/403 |
| 5,442,732 | * | 8/1995 | Matysek et al. ..................... 395/116 |
| 5,455,686 | * | 10/1995 | Nagano et al. ...................... 358/404 |
| 5,715,380 | * | 2/1998 | Lee ...................................... 395/112 |
| 5,717,841 | * | 2/1998 | Farrell et al. ........................ 395/114 |
| 5,825,988 | * | 10/1998 | Collard et al. ...................... 395/112 |
| 5,956,471 | * | 9/1999 | Ueda et al. ..................... 340/825.34 |
| 5,970,218 | * | 10/1999 | Mullin et al. ........................ 395/114 |
| 6,018,398 | * | 1/2000 | Bunker .............................. 358/1.15 |

FOREIGN PATENT DOCUMENTS

| | | | |
|---|---|---|---|
| 5-189174 | 7/1993 | (JP) | .................................. G06F/3/12 |
| 7-295767 | 11/1995 | (JP) | .................................. G06F/3/12 |

* cited by examiner

Primary Examiner—Sumati Lefkowitz
(74) Attorney, Agent, or Firm—Sidley & Austin (57) ABSTRACT

A printing environment is provided, in which the user can obtain prints of special print jobs without stagnation of ordinary print jobs which otherwise might be caused by the loading of a special print job requiring manual sheet feed or sheet change. A controller for managing the print job schedule is operated in such a manner that print jobs J1 designating ordinary paper are routinely carried out in priority over print jobs J2 requiring special paper. Upon instruction from an operation input unit, at least one of the previously-loaded print jobs J2 requiring special paper is carried out in priority over the print jobs J1 designating ordinary paper.

20 Claims, 9 Drawing Sheets

Fig. 3

130 SCHEDULE MANAGEMENT FILE

131 PRINT QUEUE

| ORDER | ATTRIBUTE | USER NAME |
|---|---|---|
| 1 | ORDINARY | 4 1 |
| 2 | ORDINARY | 4 4 |
| 3 | ORDINARY | 4 3 |
| 4 | ORDINARY | 4 1 |
| ⋮ | ⋮ | |
| i | ORDINARY | 4 2 |

→ PRINTING

132 INTERRUPT LIST

| NO. | ATTRIBUTE | USER NAME |
|---|---|---|
| 1 | MANUAL FEED | 4 2 |
| 2 | MANUAL FEED | 4 3 |
| 3 | MANUAL FEED | 4 3 |

ORDINARY JOB J1

MANUAL FEED JOB J2

NIC — 16

F i G. 4

Q1   MANUAL FEED JOB SELECT SCREEN

| NO. | USER NAME | DATE & TIME | NUMBER OF PAGES |
|---|---|---|---|
| 1 | 4 2 | 1997. 10. 15  14:00 | 5 |
| 2 | 4 3 | 1997. 10. 15  14:03 | 7 |
| 3 | 4 3 | 1997. 10. 15  14:26 | 1 2 |

Z1 points to row 1. ⇩

Z2  WHAT NUMBER OF MANUAL FEED JOB DO YOU PRINT?   3
     INPUT THE NUMBER.

PRINTING APPARATUS WITH JOB INTERRUPT CAPABILITIES AND CONTROL METHOD THEREOF

BACKGROUND OF THE INVENTION

This application is based on Japanese Patent Application No. 308424/1997 filed on Nov. 11, 1997, the contents of which are incorporated herein by reference.

1. Field of the Invention

The present invention relates to a printing apparatus having a schedule management function accepting a plurality of print jobs from one or more external devices and a control method thereof applicable to a network printer or a print system including a print server and a printer.

2. Description of the Prior Art

Generally, a printer is capable of storing a plurality of sheets of paper and has an automatic paper feed function in which the paper sheets are taken out from the storage and fed for printing automatically. The printer also has what is called a manual paper feed port by way of which paper are supplied sheet by sheet manually. The manual paper feed port is used mainly for a comparatively small number of printing using a special paper sheet different from the paper sheets stored in the machine. The special paper includes those larger or smaller than the standard size, color printing paper, paper preprinted with a remark column or the like, and an OHP sheet. In loading a print job into the printer from an external device typically including a computer, the automatic paper feed or the manual paper feed is designated.

A printer such as a network printer adapted to be shared by a plurality of external devices includes a buffer of a predetermined capacity and is capable of accepting a plurality of print jobs. In other words, the printer can accept a print job during the printing work as well as when waiting for a print job.

The conventional printing apparatuses are configured so that print jobs are performed in the order in which they are loaded into the machine regardless of automatic or manual paper feed. On the other hand, a system configuration has been suggested in which the printing order of priority can be set, the actual printing order can be changed and the print jobs can be canceled as desired by the user operating an external device or the printing apparatus (JP-A-7-295767).

In the prior art, as described above, the print jobs are carried out in the order in which they are loaded into the printer. In the case where a print job of manual paper feed is loaded, therefore, print jobs which may be loaded thereafter, regardless of automatic or manual paper feed, are not carried out until the previously-loaded print job of manual paper feed is complete. Assume, for example, that the user who has designated a print job of manual paper feed on an external device has forgotten to feed paper at the place of installation of the printer, the printer is left in a substantially inoperative state waiting for paper feed at the sacrifice of other users being troubled.

Another problem is that the user who has come to the printer at the place of installation thereof to feed paper manually may have to wait for a long time until other print jobs of automatic paper feed are complete and his or her turn comes.

SUMMARY OF THE INVENTION

The object of the present invention is to provide a printing environment in which the user can obtain prints of a special print job requiring manual sheet feed or sheet change at any time without stagnation of ordinary print jobs.

According to the present invention, there is provided a printing apparatus comprising a receiving section for receiving and accumulating a plurality of print jobs transmitted from one or more external devices, said print jobs including a first print job with specific attribute information added thereto and a second print job with no specific attribute information added thereto; an operation input unit for inputting an instruction to execute said first print job by operation of a user; and a controller for executing said second print job in the order of accumulation in said receiving section, and for, when the instruction is input through said operation input unit, suspending the execution of said second print job and executing said first print job; wherein said controller executes said first print job only when the instruction is input through said operation input unit.

In carrying the present invention in one preferred mode, the controller manages a print job schedule in which print jobs designating ordinary paper rather than special paper are normally executed and upon an appropriate instruction from the operation input unit, at least one of the previously-loaded print jobs requiring special paper is executed in priority over those using ordinary paper.

The operation input unit includes a manual button 32, for example, mounted in an operation panel of the printer or the like. When the user gives an instruction to the printer by way of the manual button 32, a list of print jobs (manual feed jobs J2) requiring special paper are displayed. The user designates one or more manual feed jobs J2 from among them. Then, a print job designating ordinary paper (ordinary job J1), which may be proceeding, is suspended and the designated manual feed job J2 is executed in priority. Upon completion of the printing designated as manual feed job J2, the ordinary job J1 that has thus far been suspended is resumed.

According to the preferred mode of the present invention, the ordinary paper means the paper housed in a paper cassette in such a manner as to permit automatic feed, and the special paper means those paper of a size, a color or a quality different from ordinary paper and not normally housed in the paper cassette. Special paper are generally manually fed but may be automatically fed. For automatic feed, the special paper are housed in the paper cassette in place of ordinary paper or are housed in a paper cassette different from that of ordinary paper. Accordingly, the preprinted paper or color paper which can be normally housed to be fed automatically are "ordinary paper." A print job requiring special paper is the one in which the user is required to make an arrangement to feed the special paper (automatically or manually) after loading the particular print job.

DESCRIPTION OF THE PREFERRED EMBODIMENTS

Figure 1:
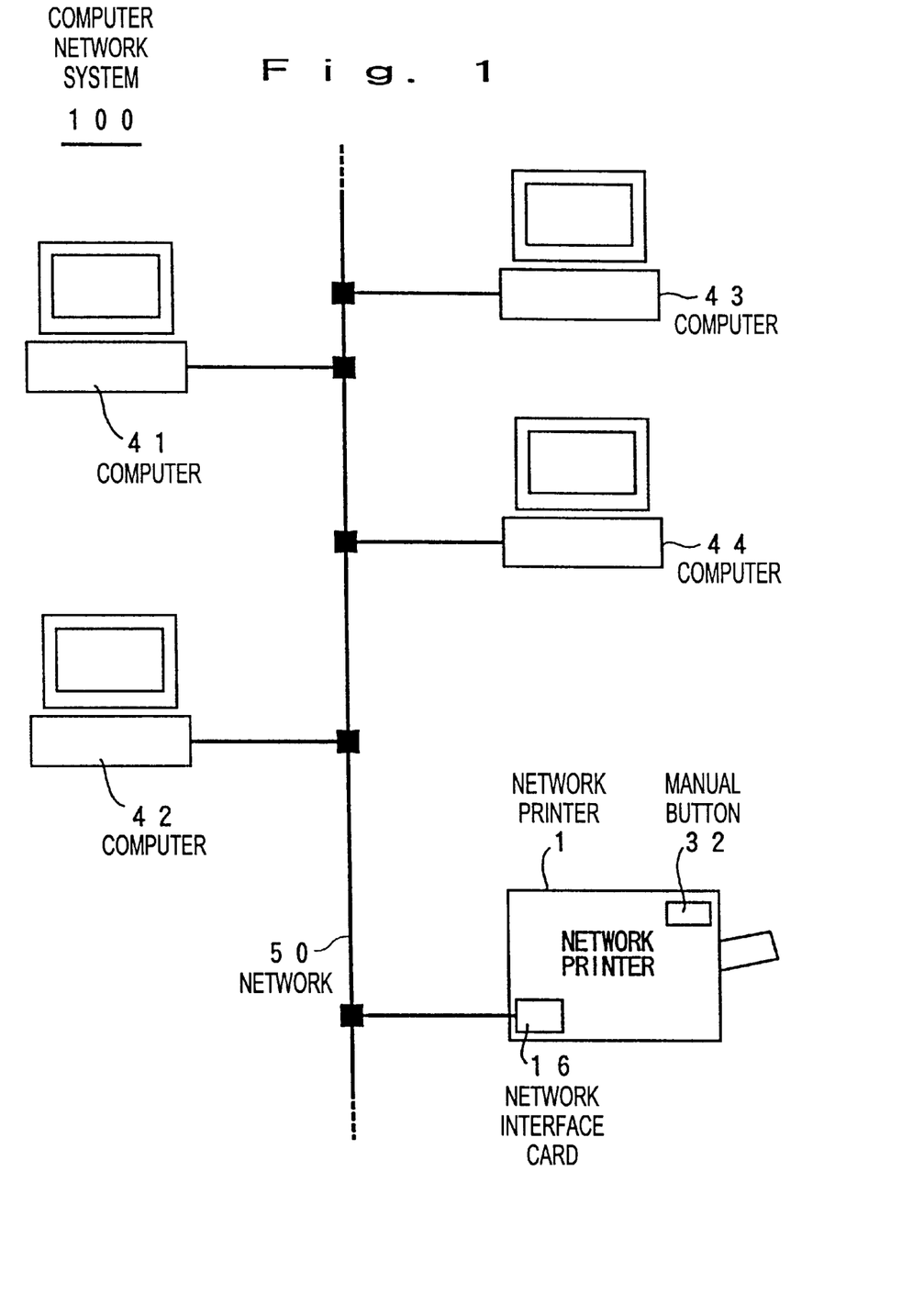
FIG. 1 is a diagram showing a network configuration according to the present invention.

FIG. 1 is a diagram showing a network configuration according to the present invention.

In FIG. 1, a computer network system 100 includes a plurality of computers 41 to 44 connected by a network 50 like LAN for sharing a network printer 1. The network printer 1 has built therein a network interface card (NIC) 16 for connection with the network 50. With the computer network system 100, the single computer 41 functions as a print server. It is also possible to employ a system in which the network printer 1 is connected to the computer 41 by use of a parallel port, though not shown, and thus is connected to the network 50 through the computer 41.

Figure 2:
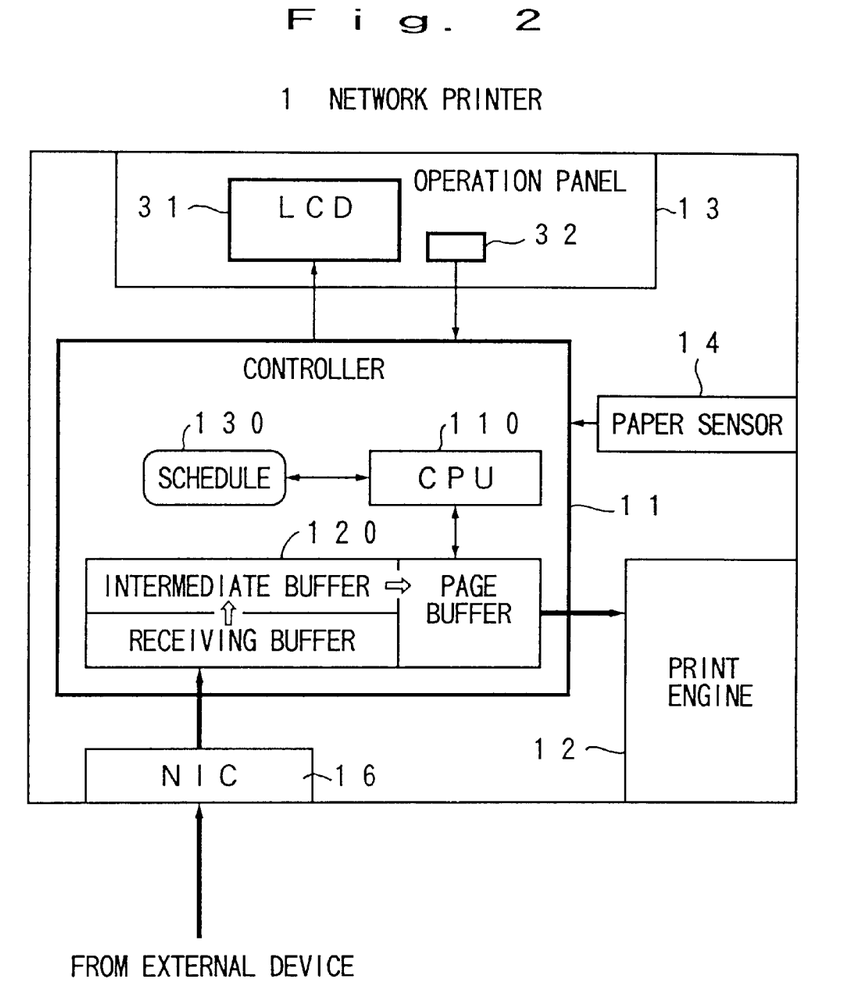
FIG. 2 is a functional block diagram showing a network printer according to the present invention.

FIG. 2 is a functional block diagram showing a network printer according to the present invention.

In FIG. 2, the network printer 1 is a page printer configured in such a manner that printing by either automatic or manual paper feed is possible. The network printer 1 includes a controller 11 for control and data processing, a print engine 12 including a paper feed mechanism, an operation panel 13 for giving input instructions, a paper sensor 14 for detecting the presence or absence of the paper manually fed and the network interface card 16.

The operation panel 13 includes a liquid crystal display (LCD) 31 for displaying a guide, and a manual button 32 for designating a print job requiring manual paper feed (manual feed job). The controller 11 includes a CPU 110 mainly constituted by a microprocessor and an image memory 120 for storing print data in various processing stages. The CPU 110 processes data for command analysis and bit map development and controls the printing order of print jobs by a schedule management file 130 arranged in a work area.

Figure 3:
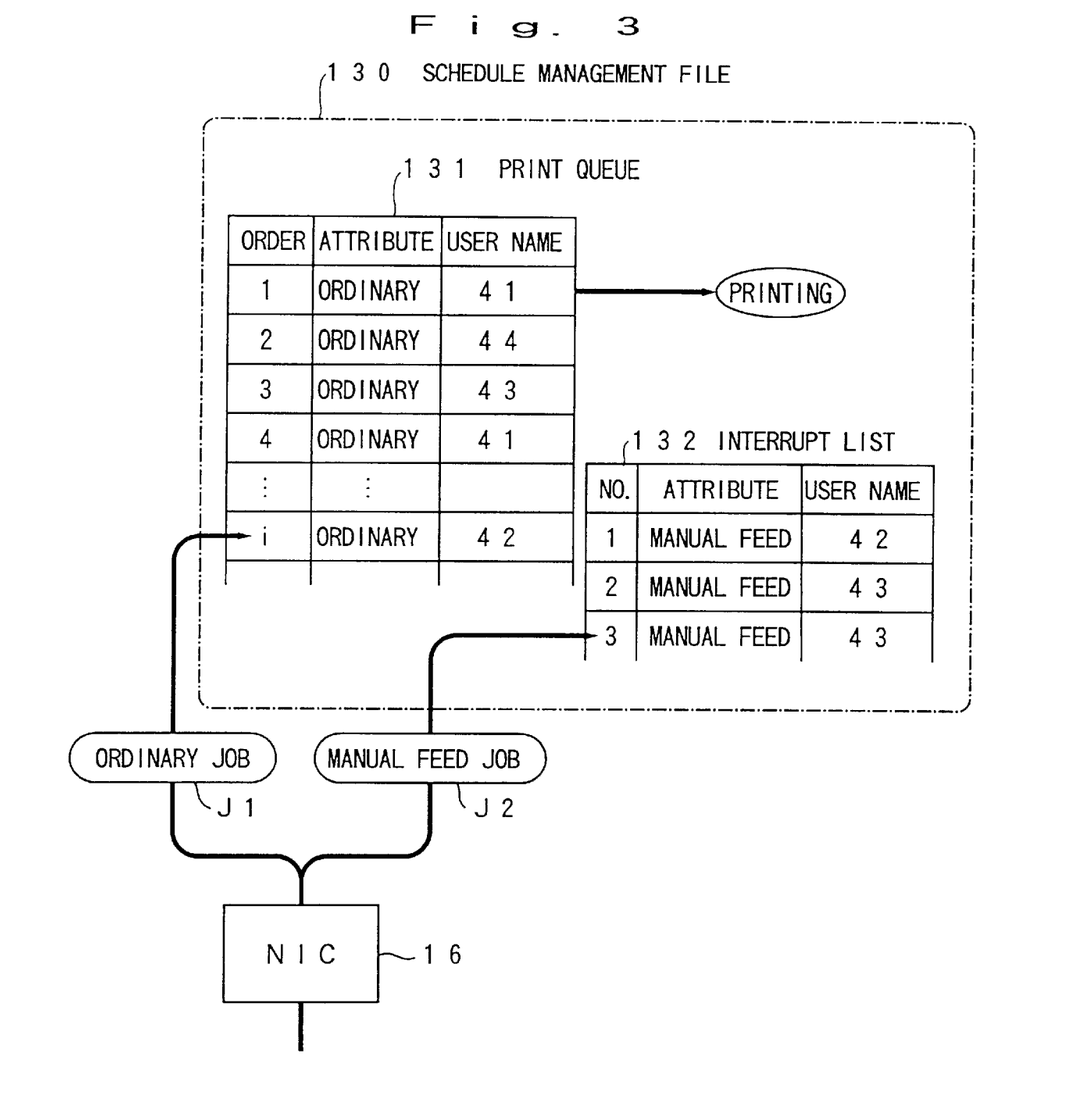
FIG. 3 is a model diagram showing an example of schedule management.

FIG. 3 is a model diagram showing an example of schedule management.

As shown in FIG. 3, the network printer 1 is loaded with two types of print jobs from the computers 41 to 44 constituting external devices. One is ordinary jobs J1 designating automatic paper feed, and the other is manual feed jobs J2 designating manual paper feed.

The schedule management file 130 includes a print queue 131 and an interrupt list 132. The CPU 110 identifies the paper feed designation information for a print job received through the NIC 16. The ordinary jobs J1 are registered in the order in which they are loaded in the print queue 131, and the manual feed jobs J2 are registered in the interrupt list 132.

The printing work is basically performed only for the ordinary jobs J1 registered in the print queue 131 in the absence of an interrupt instruction by the manual button 32. Specifically, the ordinary job J1 at the head of the print queue 131 is determined as an object of printing. Any manual feed job J2 which may be loaded before the ordinary jobs J1 is held from the printing work and the ordinary jobs J1 are performed first. The ordinary jobs J1 for which the printing work is complete are deleted from the print queue 131, and the printing order of the registered ordinary jobs J1 is advanced. In this way, the job stagnation in the prior art (the state waiting for a manual paper feeding) can be avoided by giving priority normally to the ordinary job J1 over the manual feed job J2.

Upon operating the manual button 32, on the other hand, the manual feed job J2 is given priority over the ordinary job J1 unlike during the normal time. In this case, the CPU 110 lists up the manual feed jobs J2 registered in the interrupt list 132 on the LCD 31 and prompts the user to designate an object of printing. Then, the printing of the ordinary job J1, if proceeding, is suspended by page, for example, and the print engine 12 is released for performing the manual feed job J2. Upon completion of the printing of the designated manual feed job J2, the particular manual feed job J2 is deleted from the interrupt list 132, and the operation returns to the state in which only the ordinary job J1 registered in the print queue 131 is performed.

Figure 4:
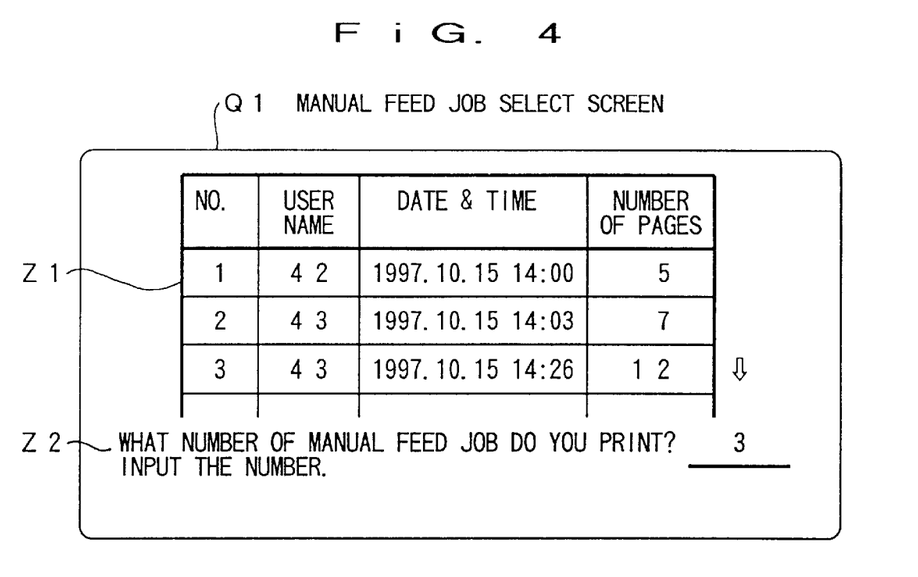
FIG. 4 is a diagram showing a manual feed job select screen.

FIG. 4 is a diagram showing a manual feed job select screen.

As shown in FIG. 4, the manual feed job select screen Q1 includes a list Z1 having manual feed jobs arranged in the order of registration (loading) in the interrupt list 132 and a message Z2 prompting the user to input the number. The user name, the date and time of loading, the number of pages and other job identified information as well as the choice number are displayed in the list Z1. The user name may be the number of the external device or the title of the document (file name) to be printed as well as the name of the user himself or herself. The user desiring the printing by manual feed inputs the choice number corresponding to the desired manual feed job J2 by way of a predetermined button on the operation panel 13. In the shown case, the choice number "3" is input. In the presence of a paper sheet in the manual paper feed port, the manual feed job J2 begins as designated. Consequently, the user can produce the desired prints by setting the paper sheets equal to the number of pages one by one or collectively.

Figure 5:
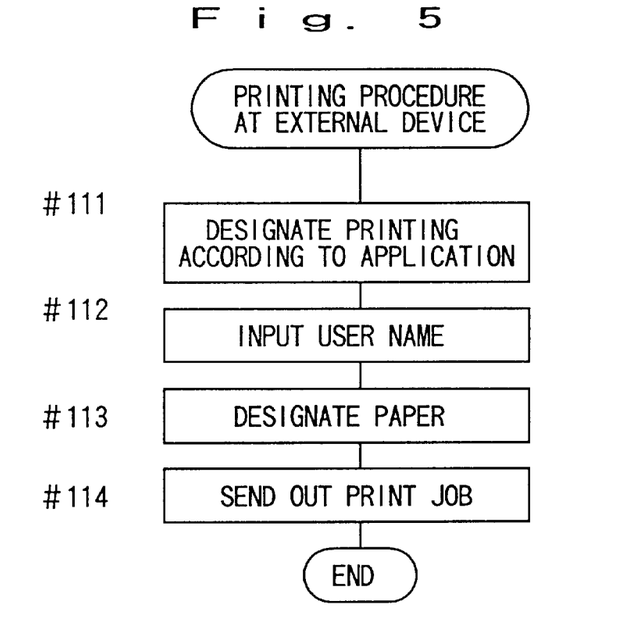
FIG. 5 is a flowchart showing the printing steps on the part of an external device.

FIG. 5 is a flowchart showing the printing steps on the part of an external device.

In the flowchart of FIG. 5, when the user designates a printing according to an application program, the print driver is started, and it becomes possible to designate the printing conditions (#111). The user inputs a user name (#112), designates a paper feed mode (#113), and instructs a print job to be loaded (#114). In designating a paper feed mode, the user selects whether the ordinary paper cassette or the manual feed tray is to be used. As an alternative, the printer may be configured to permit the user to select whether the ordinary paper or the special paper is used. In this configuration, "whether or not special paper is used" is determined in step #122 described later.

Figure 6:
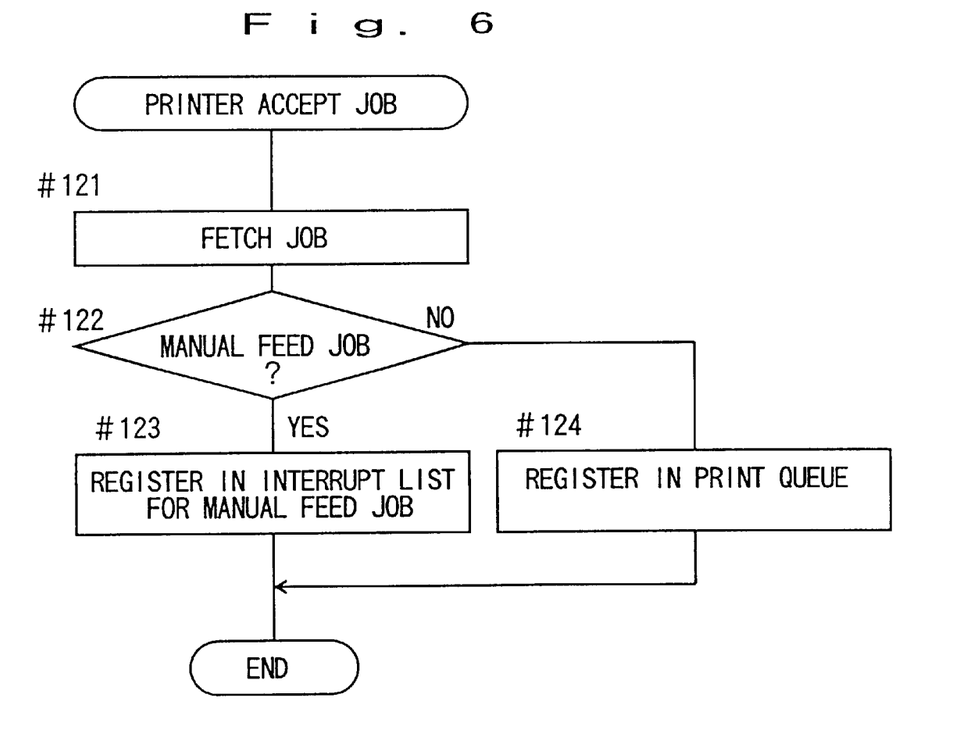
FIG. 6 is a flowchart showing the process of accepting jobs on the part of the printer.

FIG. 6 is a flowchart showing the process of accepting jobs on the part of the printer.

In the flowchart of FIG. 6, the print job received is taken in and the type of job is determined (#121, #122). The manual feed job J2, if any, is registered in the interrupt list 132 providing a queue dedicated to manual feed job J2 (#123). An ordinary job J1, on the other hand, is registered in the print queue 131 (#124).

Figure 7:
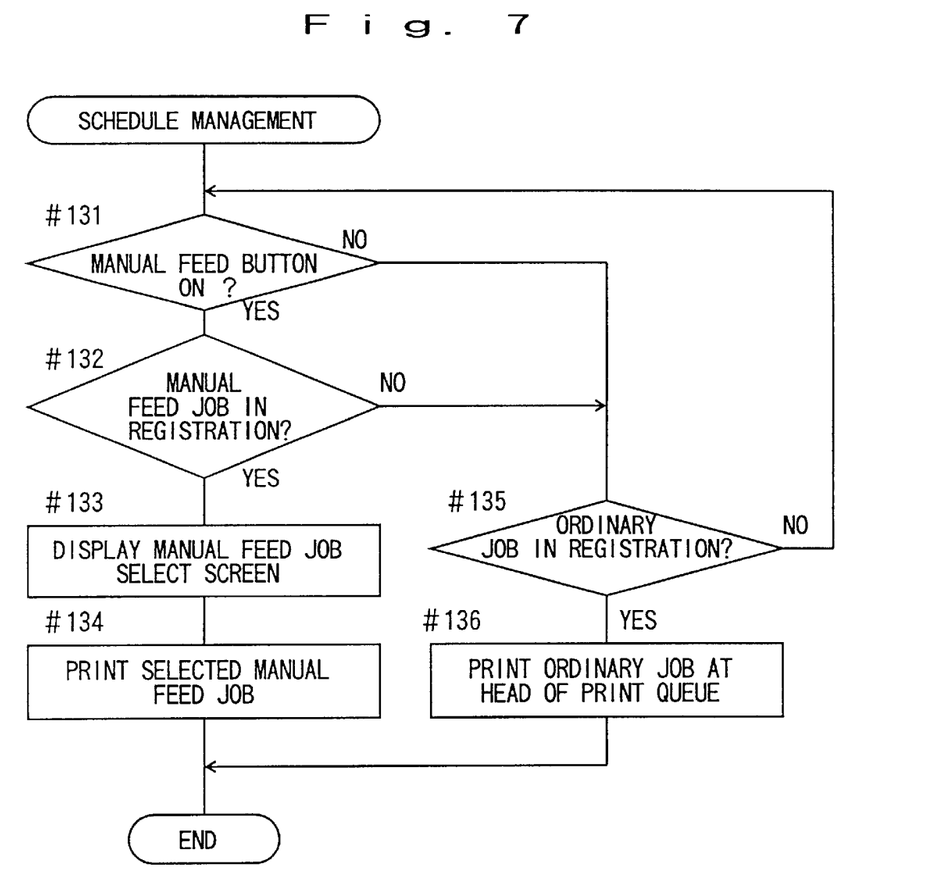
FIG. 7 is a flowchart of the schedule management executed by the CPU.

FIG. 7 is a flowchart of the schedule management executed by the CPU.

In the flowchart of FIG. 7, on the other hand, if the manual button 32 is turned on (#131), it is determined whether the manual feed job J2 is registered in the interrupt list 132 or not (#132). When the manual feed job J2 is registered, the manual feed job select screen Q1 is displayed and the selected manual feed job J2 is designated as an object to print (#133, #134).

During the normal operation when the manual feed button 32 is off or when the manual button 32 is turned on but the manual feed job J2 is not registered, it is determined whether the ordinary job J1 is registered in the print queue 131 or not (#135). When the ordinary job J1 is registered, the leading (highest-priority) ordinary job J1 is determined as an object to print (#136).

Figure 8:
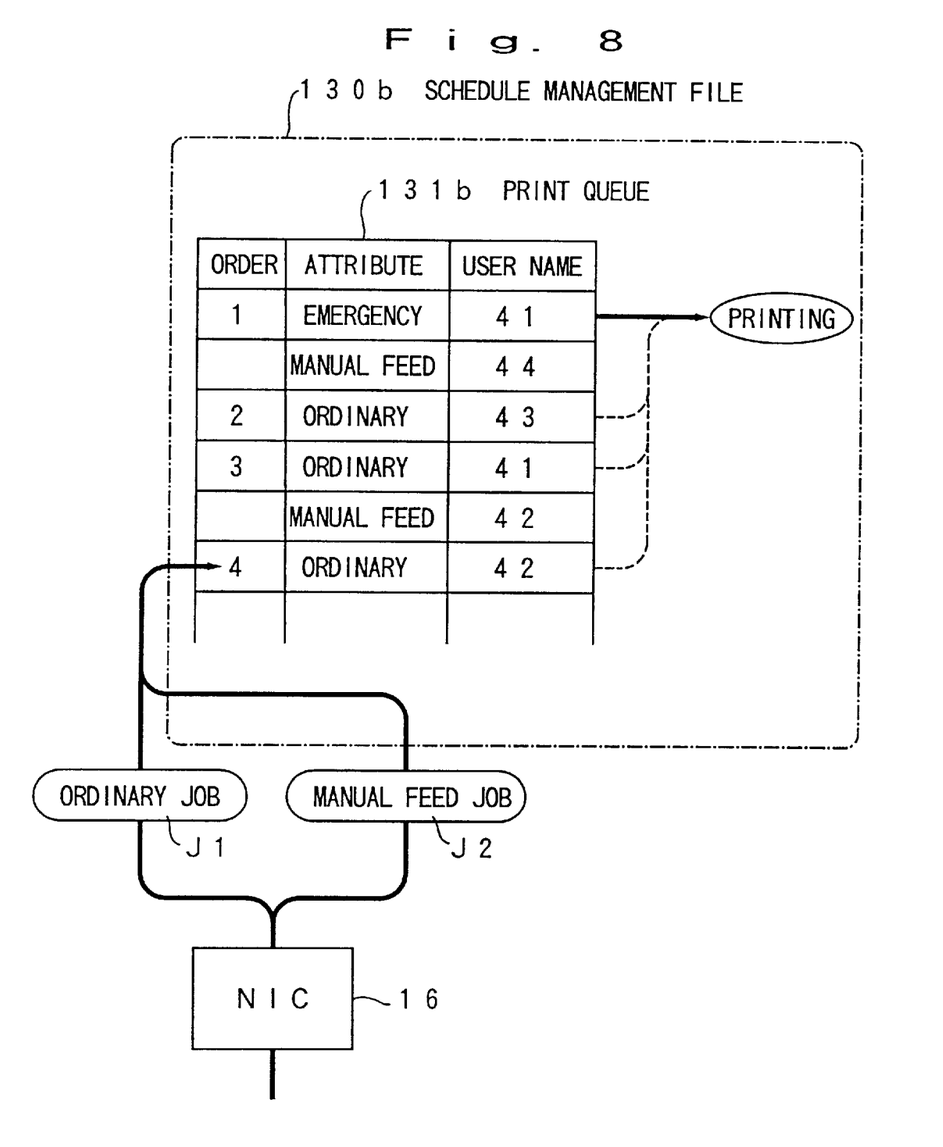
FIG. 8 is a model diagram showing another example of schedule management.

FIG. 8 is a model diagram showing another example of schedule management.

In the example shown in FIG. 8, the schedule management file 130b includes only a print queue 131b. Both the ordinary job J1 and the manual feed job J2 are registered in the print queue 131b. Nevertheless, only the ordinary jobs J1 are considered for determining the order of printing, while the printing of the manual feed job J2 is held during the normal operation as in the above-mentioned case. Also, the user can designate the ordinary job J1 for priority printing. The emergency ordinary job J1 designated for priority printing is printed in priority over the other ordinary jobs J1. When the manual feed button 32 is turned on, the manual feed jobs J2 registered in the print queue 131b are displayed in a list, then the selected manual feed job J2 is printed.

Figure 9:
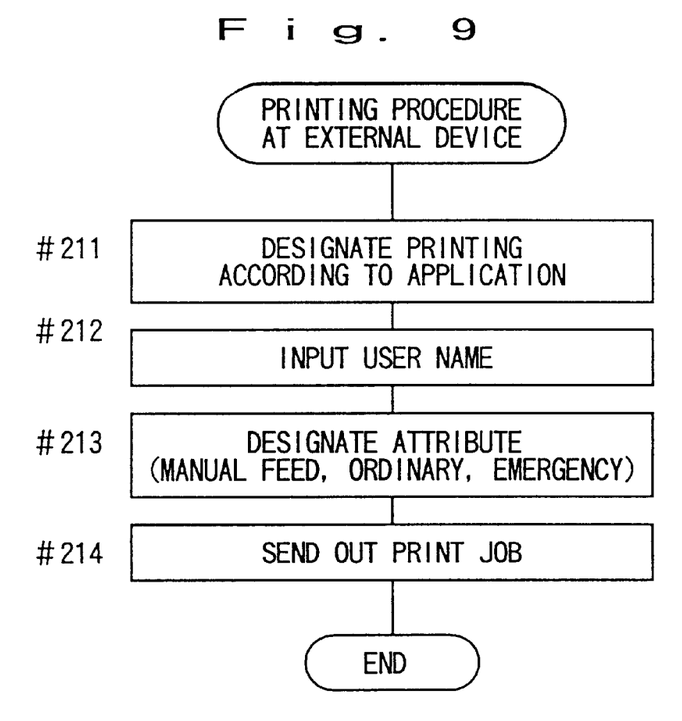
FIG. 9 is a flowchart showing a printing procedure on the part of an external device corresponding to FIG. 8.

FIG. 9 is a flowchart showing a printing procedure on the part of an external device corresponding to FIG. 8.

In the flowchart of FIG. 9, the user designates a printing according to an application program (#211), inputs the user name and attribute (#212, #213), and instructs a print job to be loaded (#214). The attributes include the paper feed mode (automatic or manual) and the requirement for priority printing.

Figure 10:
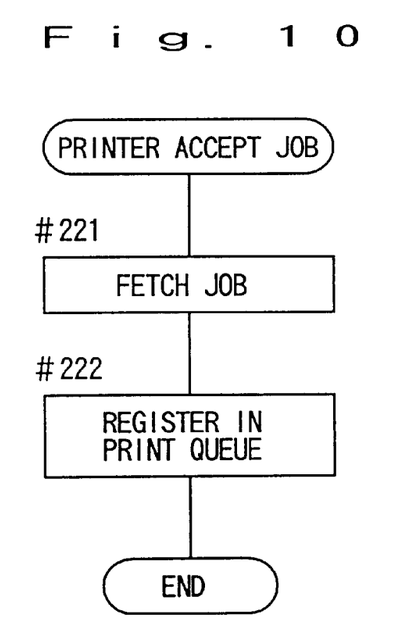
FIG. 10 is a flowchart for the process of accepting jobs on the part of the printer corresponding to FIG. 8.

FIG. 10 is a flowchart for the process of accepting jobs on the part of the printer corresponding to FIG. 8.

In the flowchart of FIG. 10, the CPU 110 fetches the received print job (#221) and registers it in the print queue 131b (#222).

Figure 11:
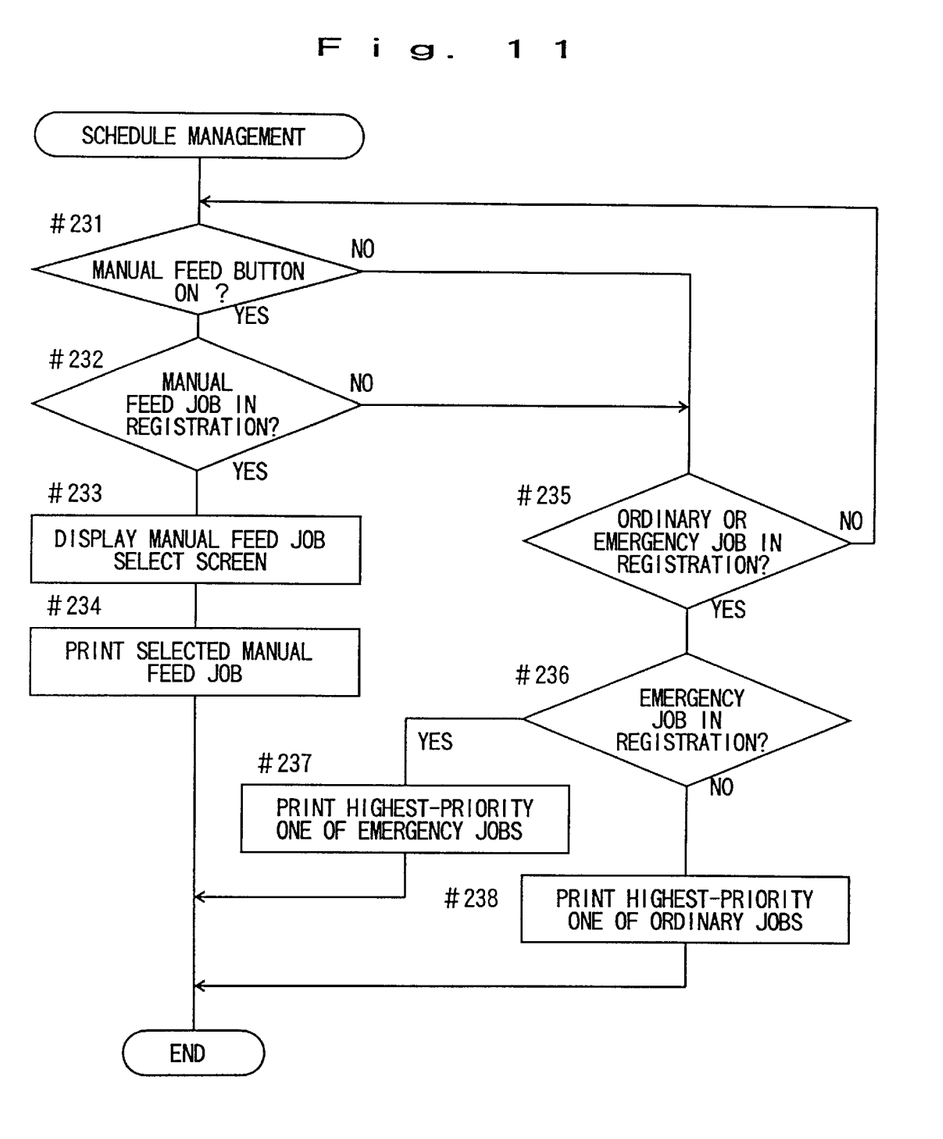
FIG. 11 is a flowchart of schedule management corresponding to FIG. 8.

FIG. 11 is a flowchart of schedule management corresponding to FIG. 8.

In the flowchart of FIG. 11, if the manual feed button 32 is turned on, it is determined whether the manual feed job J2 is registered in the print queue 131b or not (#232). When the manual feed job J2 is registered, the manual feed job select screen Q1 is displayed and the selected manual feed job J2 is determined as an object to print (#233, #234).

During the normal operation when the manual feed button 32 is off or when the manual feed button 32 is turned on but the manual feed job J2 is not registered, the contents of the registration in the print queue 131b are checked (#235, #236). In the case where an emergency ordinary job J1 is registered, the highest-priority one of the ordinary jobs J1 is determined as an object to print (#237). In the case where the emergency ordinary job J1 is not registered but other ordinary jobs J1 are registered, then, the highest-priority one of them is determined as an object to print (#238).

According to the above-mentioned embodiment, the manual feed job J2 can be designated for printing at any time regardless of the presence or absence of the ordinary job J1 and therefore there is not trouble of waiting for the end of the ordinary job J1. Once the printing of the manual feed job J2 is over, the ordinary job J1 suspended or the ordinary job J1 waiting for printing is started. Therefore, the job stagnation can be minimized.

In the embodiment described above, the printing of the ordinary job J1 is suspended in response to the turning on of the manual feed button 32. The printing of the ordinary job J1, however, can alternatively be suspended in response to the selection of the manual feed job after the manual feed button 32 is turned on. Also, the print engine 12 can be released for the manual feed job J2 at the end of the ongoing printing of an ordinary job J1. It is also possible to designate a plurality of manual feed jobs J2 collectively with the manual feed job select screen Q1 on display.

The above-mentioned embodiment refers to the case in which the manual feed job select screen Q1 is displayed and a manual feed job is selected for printing. As an alternative, print jobs can be carried out simply on first-in first-out basis. Also, an arrangement can be made in which "manual feed" and "emergency" can be designated at the same time as a job attribute unlike in the above-mentioned case. In such a case, a manual feed job is carried out in steps #235, #236, #237 in that order in the flowchart of FIG. 11. As a result, the same situation of waiting for paper feed occurs as in the prior art. This situation of waiting for paper feed is allowed, however, in view of the emergency nature of the job.

In the above-mentioned embodiment, the control system taking charge of schedule management can be provided separately from the print engine 12. The manual feed button 32 can be a switch, a keyboard or a touch panel having mechanical or electrical contacts. Also, an input can be made by way of the mouse or the like on the screen. The present invention is applicable to a printer-copier or a composite machine having an image reader and a printer integrated with each other.

What is claimed is:

1. A printing apparatus comprising:
   an automatic sheet feeder for housing a sheet to be printed on and feeding said sheet automatically;
   a manual sheet feeder which allows a user to manually set a sheet to be printed on when necessary;
   a receiving section for receiving and accumulating a plurality of print jobs transmitted from one or more external devices, said print jobs including a first print job with specific attribute information added thereto and a second print job with no specific attribute information added thereto;
   an operation input unit for inputting an instruction to execute said first print job by operation of a user; and
   a controller for executing said second print job in the order of accumulation in said receiving section, and for, when the instruction is input through said operation input unit, suspending the execution of said second print job and executing said first print job;
   wherein said controller executes said first print job only when the instruction is input through said operation input unit, and said specific attribute information indicates that said manual sheet feeder is the first to feed a sheet for said first print job.

2. A printing apparatus as defined in claim 1, further comprising a display unit,
   wherein, when the instruction is input through said operation input unit, said controller causes said display unit to display first print jobs accumulated in said receiving section and executes a print job selected by the user among the first print jobs displayed.

3. A printing apparatus as defined in claim 1,
   wherein said receiving section accumulates said first print job and said second print job in different memory areas.

4. A printing apparatus as defined in claim 1, which is connected with a plurality of external devices.

5. A method of managing the schedule for executing print jobs in a printing apparatus provided with an automatic sheet feeder for housing a sheet to be printed on and feeding said sheet automatically, and a manual sheet feeder which allows a user to manually set a sheet to be printed on when necessary, said method comprising the steps of:

(1) receiving and accumulating a plurality of print jobs transmitted from one or more external devices, said print jobs including a first print job with specific attribute information added thereto and a second print job with no specific attribute information added thereto;

(2) executing said second print job in the order of accumulation;

(3) checking whether an instruction for executing said first print job is input or not from an operation input unit included in said printing apparatus and operated by a user; and (4) suspending the execution of said second print job and executing said first print job in the case where the input of said instruction is confirmed, said first print job being executed only when said instruction is input from said operation input unit, wherein said specific attribute information indicates that said manual sheet feeder is the first to feed a sheet for said first print job.

6. A method as defined in claim 5,
wherein said printing apparatus is further provided with a display unit,
wherein said fourth step further includes a step of causing said display unit to display accumulated first print jobs and executing a first print job selected by the user among the first print jobs displayed.

7. A method as defined in claim 5,
wherein said printing apparatus is connected with a plurality of external devices.

8. A printing apparatus connected with a plurality of external devices by a network, comprising:

an automatic sheet feeder for housing a sheet to be printed on in advance and feeding said sheet automatically;

a manual sheet feeder which allows a user to manually set a sheet to be printed on;

a receiving section for receiving and accumulating a plurality of print jobs transmitted from said external devices, said print jobs including a first print job with specific attribute information added thereto and a second print job with no specific attribute information added thereto;

an operation input unit for inputting an instruction to execute said first print job by operation of a user; and a controller for executing said second print job in the order of accumulation in said receiving section, and for, when the instruction is input through said operation input unit, suspending the execution of said second print job and executing said first print job;

wherein said controller executes said first print job only when the instruction is input through said operation input unit, and said specific attribute information indicates that said manual sheet feeder is the first to feed a sheet for said first print job.

9. A printing apparatus as defined in claim 8, further comprising a display unit,
wherein, when the instruction is input through said operation input unit, said controller causes said display unit to display first print jobs accumulated in said receiving section and executes a first print job selected by the user among the print jobs displayed.

10. A printing apparatus as defined in claim 8,
wherein said receiving section accumulates said first print job and said second print job in different memory areas.

11. A printing apparatus comprising:
a first sheet feeder for housing a sheet to be printed on and feeding said sheet automatically;

a second sheet feeder for feeding a special sheet different from said sheet housed in said first sheet feeder;

a receiving section for receiving and accumulating a plurality of print jobs transmitted from one or more external devices, said print jobs including a first print job with specific attribute information added thereto and a second print job with no specific attribute information added thereto;

an operation input unit for inputting an instruction to execute said first print job by operation of a user; and a controller for executing said second print job in the order of accumulation in said receiving section, and for, when the instruction is input through said operation input unit, suspending the execution of said second print job and executing said first print job;

wherein said controller executes said first print job only when the instruction is input through said operation input unit, and said specific attribute information designates said special sheet as a sheet for said first print job.

12. A printing apparatus as defined in claim 11, further comprising a display unit,
wherein, when the instruction is input through said operation input unit, said controller causes said display unit to display first print jobs accumulated in said receiving section and executes a print job selected by the user among the first print jobs displayed.

13. A printing apparatus as defined in claim 11,
wherein said receiving section accumulates said first print job and said second print job in different memory areas.

14. A printing apparatus as defined in claim 11, which is connectable to a plurality of external devices.

15. A method of managing the schedule for executing print jobs in a printing apparatus provided with a first sheet feeder for housing a sheet to print an image on in advance and feeding said sheet automatically and a second sheet feeder for feeding a special sheet being different from said sheet housed in said first sheet feeder, said method comprising the steps of:

(1) receiving and accumulating a plurality of print jobs transmitted from one or more external devices, said print jobs including a first print job with specific attribute information added thereto and a second print job with no specific attribute information added thereto;

(2) executing said second print job in an order of accumulation;

(3) checking whether or not an instruction for executing said first print job is input or not from an operation input unit included in said printing apparatus and operated by a user; and (4) suspending the execution of said second print job and executing said first print job in the case where the input of said instruction is confirmed, said first print job being executed only when said instruction is input from said operation input unit, wherein said specific attribute information designates said special sheet as a sheet for said first print job.

16. A method as defined in claim 15,
wherein said printing apparatus is further provided with a display unit, wherein said fourth step further includes a step of causing said display unit to display accumulated first print jobs and executing a first print job selected by the user among the first print jobs displayed.

17. A method as defined in claim 15, wherein said printing apparatus is connected with a plurality of external devices.

18. A printing apparatus connected with a plurality of external devices by a network, comprising:

a first sheet feeder for housing a sheet to be printed on and feeding said sheet automatically;

a second sheet feeder for feeding a special sheet different from said sheet housed in said first sheet feeder;

a receiving section for receiving and accumulating a plurality of print jobs transmitted from said external devices, said print jobs including a first print job with specific attribute information added thereto and a second print job with no specific attribute information added thereto;

an operation input unit for inputting an instruction to execute said first print job by operation of a user; and a controller for executing said second print job in an order of accumulation in said receiving section, and for, when the instruction is input through said operation input unit, suspending the execution of said second print job and executing said first print job;

wherein said controller executes said first print job only when the instruction is input through said operation input unit and said specific attribute information designates said special sheet as a sheet for said first print job.

19. A printing apparatus as defined in claim 18, further comprising a display unit, wherein, when the instruction is input through said operation input unit, said controller causes said display unit to display first print jobs accumulated in said receiving section and executes a first print job selected by the user among the print jobs displayed.

20. A printing apparatus as defined in claim 18, wherein said receiving section accumulates said first print job and said second print job in different memory areas.

* * * * *

UNITED STATES PATENT AND TRADEMARK OFFICE
CERTIFICATE OF CORRECTION

PATENT NO. : 6,332,170 B1
DATED : December 18, 2001
INVENTOR(S) : Shinichi Ban

It is certified that error appears in the above-identified patent and that said Letters Patent is hereby corrected as shown below:

Column 4,
Lines 11 and 12, delete "J1 ,", and insert -- J1, --.

Column 6,
Line 2, delete "J1 , however", and insert -- J1, however --.

Column 7,
Line 39, delete "in advance".

Column 8,
Line 41, delete "to print an image on in advance", and insert -- to be printed on --.
Line 42, after "automatically", insert -- , --.
Line 55, delete "or not".

Signed and Sealed this

Twenty-first Day of May, 2002

Attest:

Attesting Officer

JAMES E. ROGAN
Director of the United States Patent and Trademark Office